(12) United States Patent
Ito

(10) Patent No.: US 11,306,817 B2
(45) Date of Patent: Apr. 19, 2022

(54) CONTROL APPARATUS FOR VEHICLE

(71) Applicant: TOYOTA JIDOSHA KABUSHIKI KAISHA, Toyota (JP)

(72) Inventor: Kohei Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/189,416

(22) Filed: Mar. 2, 2021

(65) Prior Publication Data

US 2021/0277993 A1 Sep. 9, 2021

(30) Foreign Application Priority Data

Mar. 9, 2020 (JP) .............................. JP2020-040370

(51) Int. Cl.
*F16H 59/74* (2006.01)
*F16H 59/36* (2006.01)
*F16H 61/02* (2006.01)
*G01M 15/11* (2006.01)
*F16H 61/12* (2010.01)

(52) U.S. Cl.
CPC ............. *F16H 59/74* (2013.01); *F16H 59/36* (2013.01); *F16H 61/0213* (2013.01); *F16H 61/12* (2013.01); *G01M 15/11* (2013.01); *F16H 2059/366* (2013.01); *F16H 2061/1216* (2013.01)

(58) Field of Classification Search
CPC .... F16H 59/36; F16H 59/74; F16H 2059/366; F16H 2059/746; F16H 61/0213; F16H 61/12; F16H 2061/1216; G01M 15/11
See application file for complete search history.

(56) References Cited

U.S. PATENT DOCUMENTS

| 2014/0128222 A1* | 5/2014 | Norman ................ B60W 10/06 477/98 |
| 2017/0159589 A1* | 6/2017 | Glugla ................ F02D 41/0077 |
| 2017/0350333 A1* | 12/2017 | Glugla ................ F02D 41/1446 |

FOREIGN PATENT DOCUMENTS

JP 11-182669 A 7/1999

* cited by examiner

*Primary Examiner* — Edwin A Young
(74) *Attorney, Agent, or Firm* — Oblon, McClelland, Maier & Neustadt, L.L.P.

(57) ABSTRACT

A control apparatus for a vehicle that includes an engine; a transmission; a damper and a clutch. The transmission has a gear ratio that is variable in a range including a torque-fluctuation insufficient absorption region in which a damper spring of the damper is elastically deformed to a certain maximum limit when a misfire occurs in the engine. The control apparatus includes: a misfire determination portion configured to determine occurrence of the misfire in the engine; and a misfire-case shift control portion configured, upon determination of the occurrence of the misfire in the engine by the misfire determination portion when the gear ratio of the transmission is in the torque-fluctuation insufficient absorption region, to cause the transmission to execute a shift-down action such that the gear ratio becomes higher than a higher threshold value of the torque-fluctuation insufficient absorption region.

6 Claims, 9 Drawing Sheets

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O : ENGAGED    BLANK : RELEASED

CONTROL APPARATUS FOR VEHICLE

This application claims priority from Japanese Patent Application No. 2020-040370 filed on Mar. 9, 2020, the disclosure of which is herein incorporated by reference in its entirety.

FIELD OF THE INVENTION

The present invention relates to techniques for advantageously suppressing fluctuation of load applied to an automatic transmission upon occurrence of a misfire in an internal combustion engine.

BACKGROUND OF THE INVENTION

There is known a vehicle including an internal combustion engine, an automatic transmission and a torque converter that is provided with a lockup clutch, wherein the torque converter is disposed in a power transmission path between the internal combustion engine and the automatic transmission. An example of such a vehicle is described in JP-H11-182669A. It is noted that this Japanese Patent Application Publication discloses a technique for releasing the lockup clutch upon detection of a misfire in the internal combustion engine.

SUMMARY OF THE INVENTION

By the way, it might be possible to use a connecting/disconnecting device (such as dry clutch and wet clutch) in place of or in addition to the torque converter as a fluid transmission device in the vehicle disclosed in the above-identified Japanese Patent Application Publication. In a vehicle in which a power is to be transmitted through the connecting/disconnecting device, it might be possible to place the connecting/disconnecting device in its disconnecting state upon occurrence of the misfire in the internal combustion engine during running of the vehicle, so as to avoid application of largely fluctuating load to the automatic transmission. However, in this arrangement, since the drive power transmitted from the internal combustion engine to the automatic transmission is momentarily reduced upon placement of the connecting/disconnecting device into the disconnecting state, there is a risk of an abrupt change of behavior of the vehicle.

The present invention was made in view of the background art described above. It is therefore an object of the present invention to provide a control apparatus for a vehicle, which is capable of advantageously suppressing change of behavior of the vehicle and fluctuation of a torque applied to an automatic transmission of the vehicle, in the event of occurrence of a misfire in an internal combustion engine.

Various studies made by the inventor of the present invention and his collaborators under the above-described situation revealed a fact that, in a vehicle that includes a damper provided between the internal combustion engine and the automatic transmission, wherein the damper includes a damper spring which is elastically deformable to a certain maximum limit and which is configured to absorb fluctuation of a torque outputted from the internal combustion engine owing to elastic deformation of the damper spring, it is possible to advantageously suppress fluctuation of the torque applied to the automatic transmission upon occurrence of the misfire during running of the vehicle, by causing the automatic transmission to execute a shift-down action such that a gear ratio of the automatic transmission becomes higher than a predetermined value. That is, the studies revealed the fact that a range in which the gear ratio of the automatic transmission is variable includes a torque-fluctuation insufficient absorption region in which the damper spring of the damper is elastically deformed to the above-described certain maximum limit when the misfire occurs in the internal combustion engine, and that, by executing a shift-down action that causes the gear ratio to become higher than a higher threshold value of the torque-fluctuation insufficient absorption region, upon occurrence of the misfire in the internal combustion engine, it is possible to avoid the damper spring from being elastically deformed to the certain maximum limit and accordingly to advantageously suppress the large fluctuation of the torque applied to the automatic transmission of the vehicle in spite of the occurrence of the misfire. The present invention has been made based on the above-described revealed fact.

The above object is achieved according to the following aspects of the present invention.

According to a first aspect of the invention, there is provided a control apparatus for a vehicle that includes: an internal combustion engine; an automatic transmission; a damper and a clutch, such that the damper and the clutch are disposed between the internal combustion engine and the automatic transmission, wherein the damper includes a damper spring that is elastically deformable to a certain maximum limit, and is configured to absorb fluctuation of torque outputted from the internal combustion engine owing to elastic deformation of the damper spring, wherein the clutch is configured to establish and interrupt transmission of a power between the internal combustion engine and the automatic transmission, wherein the automatic transmission has a gear ratio that is variable in a range including a torque-fluctuation insufficient absorption region in which the damper spring of the damper is elastically deformed to the certain maximum limit when a misfire occurs in the internal combustion engine, wherein the control apparatus comprises: (a) a misfire determination portion configured to determine occurrence of the misfire in the internal combustion engine; and (b) a misfire-case shift control portion configured, upon determination of the occurrence of the misfire in the internal combustion engine by the misfire determination portion when the gear ratio of the automatic transmission is in the torque-fluctuation insufficient absorption region, to cause the automatic transmission to execute a shift-down action such that the gear ratio becomes higher than a higher threshold value of the torque-fluctuation insufficient absorption region.

According to a second aspect of the invention, in the control apparatus according to the first aspect of the invention, the misfire-case shift control portion is configured, when the determination of the occurrence of the misfire in the internal combustion engine by the misfire determination portion is cancelled, to allow the automatic transmission to execute a shift-up action such that the gear ratio becomes not higher than the higher threshold value of the torque-fluctuation insufficient absorption region.

According to a third aspect of the invention, in the control apparatus according to the first or second aspect of the invention, the vehicle further includes an electric motor which serves as a drive power source and which is provided in a power transmission path between the clutch and the automatic transmission.

According to a fourth aspect of the invention, in the control apparatus according to any one of the first through third aspects of the invention, the misfire determination portion is configured to determine the occurrence of the misfire in the internal combustion engine, depending on whether periodical change in a rotational acceleration of the internal combustion engine is caused in synchronization with an ignition timing of the internal combustion engine.

According to a fifth aspect of the invention, in the control apparatus according to the first through fourth aspects of the invention, the vehicle includes a display device configured to display vehicle information for a driver of the vehicle, wherein the control apparatus is configured, when the occurrence of the misfire in the internal combustion engine is determined by the misfire determination portion, to cause the display device to display the occurrence of the misfire.

According to a sixth aspect of the invention, in the control apparatus according to the first through fifth aspects of the invention, the automatic transmission is a step-variable automatic transmission configured to establish a selected one of a plurality of gear positions.

In the control apparatus according to the first aspect of the invention, the range in which the gear ratio of the automatic transmission is variable includes the torque-fluctuation insufficient absorption region in which the damper spring of the damper is elastically deformed to the certain maximum limit when the misfire occurs in the internal combustion engine, wherein the control apparatus comprises: the misfire determination portion configured to determine occurrence of the misfire in the internal combustion engine; and the misfire-case shift control portion configured, upon determination of the occurrence of the misfire in the internal combustion engine by the misfire determination portion when the gear ratio of the automatic transmission is in the torque-fluctuation insufficient absorption region, to cause the automatic transmission to execute the shift-down action such that the gear ratio becomes higher than the higher threshold value of the torque-fluctuation insufficient absorption region. Thus, when the occurrence of the misfire of the internal combustion engine is determined by the misfire determination portion, the misfire-case shift control portion causes the automatic transmission to execute the shift-down action by which the gear ratio becomes higher than the higher threshold value of the torque-fluctuation insufficient absorption region, so that the damper spring becomes not deformed to the certain maximum limit even in the event of occurrence of the misfire in the internal combustion engine, namely, so that the damper spring becomes not deformed to a certain extent at which further deformation of the damper spring is inhibited. It is therefore possible to enable the damper to advantageously suppress large fluctuation of a load applied to the automatic transmission in the event of the occurrence of the misfire in the engine. Further, since the large fluctuation of the load applied to the automatic transmission is suppressed by the misfire-case shift control portion in the event of the occurrence of the misfire, it is possible to eliminate a need to release the clutch for suppressing the large fluctuation of the load applied to the automatic transmission in the event of the occurrence of the misfire, and to advantageously suppress change of behavior of the vehicle upon the occurrence of the misfire in the internal combustion engine.

In the control apparatus according to the second aspect of the invention, the misfire-case shift control portion is configured, when the determination of the occurrence of the misfire in the internal combustion engine by the misfire determination portion is cancelled, to allow the automatic transmission to execute the shift-up action such that the gear ratio becomes not higher than the higher threshold value of the torque-fluctuation insufficient absorption region. Thus, even if the occurrence of the misfire of the internal combustion engine has been once determined by the misfire determination portion, when the determination of the occurrence of the misfire of the internal combustion engine is cancelled, the misfire-case shift control portion allows execution of the shift-up action by which the gear ratio of the automatic transmission becomes not higher than the higher threshold value of the torque-fluctuation insufficient absorption region.

In the control apparatus according to the third aspect of the invention, the electric motor which serves as a drive power source is provided in the power transmission path between the clutch and the automatic transmission. That is, the present invention is applicable also to a one-motor hybrid vehicle having the drive power sources in the form of the internal combustion engine and the one electric motor.

In the control apparatus according to the fourth aspect of the invention, the misfire determination portion determines the occurrence of the misfire in the internal combustion engine, depending on whether the periodical change in the rotational acceleration of the internal combustion engine is caused in synchronization with the ignition timing of the internal combustion engine. Therefore, the determination of the occurrence of the misfire in the internal combustion engine can be made more reliably by the misfire determination portion.

In the control apparatus according to the fifth aspect of the invention, the vehicle includes the display device configured to display the vehicle information for the driver of the vehicle, wherein the control apparatus is configured, when the occurrence of the misfire in the internal combustion engine is determined by the misfire determination portion, to cause the display device to display the occurrence of the misfire. Thus, since the occurrence of the misfire of the internal combustion engine is displayed upon determination of the occurrence of the misfire by the misfire determination portion, it is possible to guide the vehicle driver to promptly take the vehicle to a service maintenance workshop or the like.

In the control apparatus according to the sixth aspect of the invention, the automatic transmission is the step-variable automatic transmission configured to establish a selected one of the plurality of gear positions. That is, the present invention is advantageously applicable to a vehicle including the step-variable automatic transmission.

DETAILED DESCRIPTION OF PREFERRED EMBODIMENTS

Hereinafter, preferred embodiments of the invention will be described in detail with reference to the accompanying drawings.

First Embodiment

Figure 1:
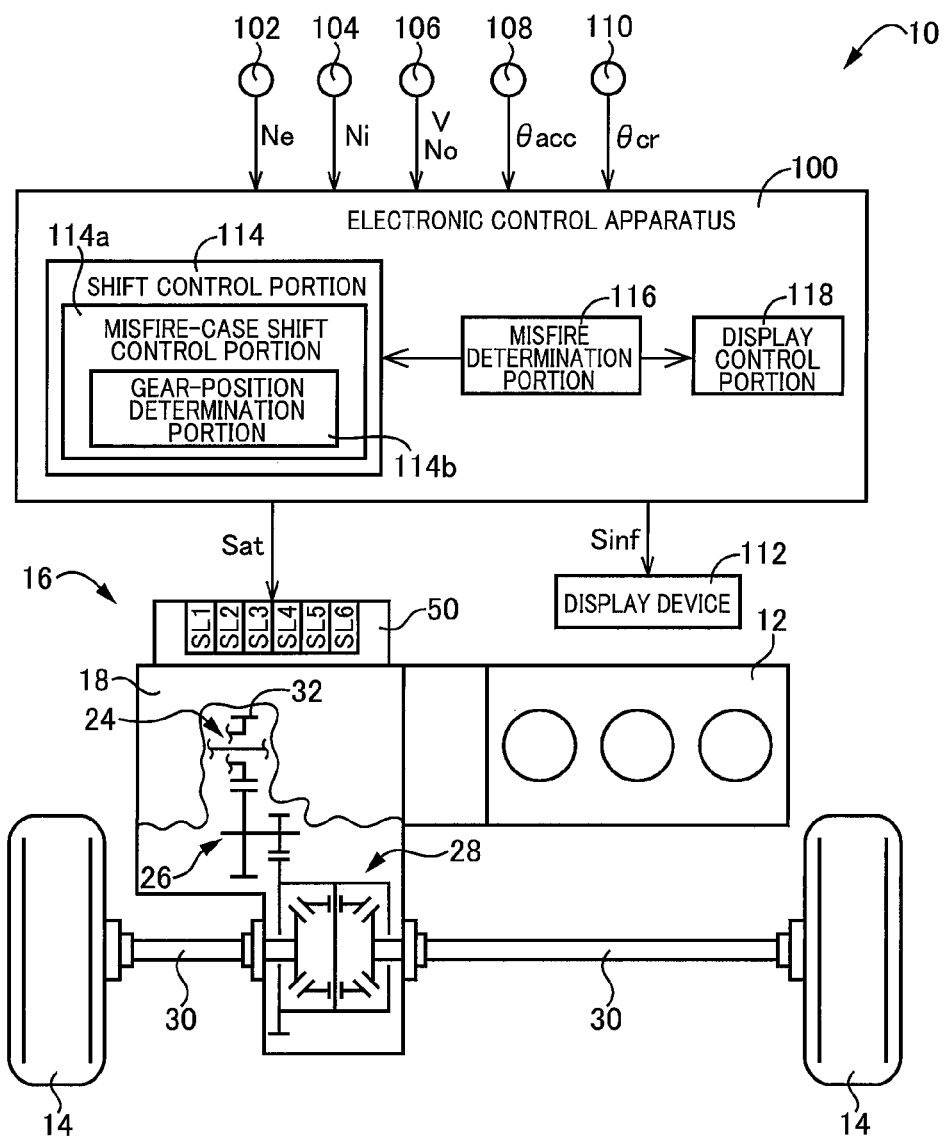
FIG. 1 is a schematic view showing a construction of a vehicle to which the present invention is applied, and showing also major portions of control functions and control systems that are provided to perform various control operations in the vehicle.

FIG. 1 is a schematic view showing a construction of a vehicle 10 to which the present invention is applied, and showing also major portions of control functions and control systems that are provided to perform various control operations in the vehicle 10. As shown in FIG. 1, the vehicle 10 includes an engine (internal combustion engine), drive wheels 14 and a power transmitting apparatus 16 that is disposed in a power transmission path between the engine 12 and the drive wheels 14. The power transmitting apparatus 16 includes a casing 18 as a non-rotary member that is attached to a body of the vehicle 10, a damper 20 (see FIG. 2), an automatic transmission 24, a reduction gear device 26, a differential gear device 28 and a pair of drive shafts 30. The damper 20 is disposed in a power transmission path between the engine 12 and the clutch 22, namely, disposed in a power transmission path between the engine 12 and the automatic transmission 24. The clutch 22 is constituted by a dry clutch or a wet clutch, for example, and is configured to selectively establish and interrupt transmission of a power between the engine 12 and the automatic transmission 24, namely, selectively connect and cut off the power transmission path between the engine 12 and the automatic transmission 24.

The reduction gear device 26 is connected to a transmission output gear 32 that is an output rotary member of the automatic transmission 24, in a power transmittable manner. The differential gear device 28 is connected to the reduction gear device 26 in a power transmittable manner. In the power transmitting apparatus 16, the power outputted from the engine 12 is transmitted sequentially through the damper 20, clutch 22, automatic transmission 24, reduction gear device 26, differential gear device 28 and drive shafts 30, for example, to the drive wheels 14. The power corresponds to a torque and a force unless they are to be distinguished from one another. It is noted that, in the present embodiment, the power transmitting apparatus 16 is not provided with a fluid transmission device such as a torque converter that is provided with a lockup clutch.

Figures 2, 3:
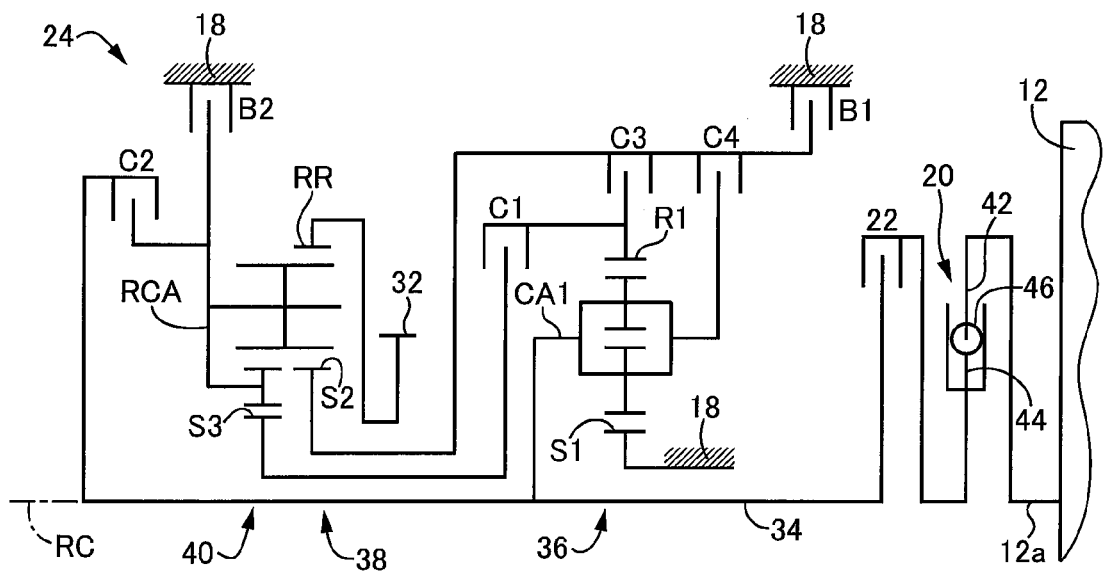
FIG. 2 is a schematic view showing, by way of examples, a damper, a clutch and an automatic transmission that are included in the vehicle shown in FIG. 1.
FIG. 3 is a table indicating a relationship between each gear position of the automatic transmission and a combination of engagement devices of the step-variable automatic transmission, which are to be placed in their engaged states to establish the gear position in the step-variable automatic transmission.

FIG. 2 is a schematic view showing, by way of examples, the damper 20, the clutch 22 and the automatic transmission 24. It is noted that the damper 20, clutch 22, automatic transmission 24 and other units are constructed substantially symmetrically with respect to an axis RC of a transmission input shaft 34 that is an input rotary member of the automatic transmission 24, so that a lower half of each of these units located on a lower side of the axis RC is not shown in FIG. 2.

As shown in the FIG. 2, the automatic transmission 24 is a known automatic transmission of a planetary gear type which is provided with a plurality of planetary gear devices including a first planetary gear device 36, a second planetary gear device 38 and a third planetary gear device 40, and also a plurality of engagement devices including a first clutch C1, a second clutch C2, a third clutch C3, a fourth clutch C4, a first brake B1 and a second brake B2. Hereinafter, the clutches C1-C4, brakes B1 and B2 will be simply referred to as engagement devices C unless they are to be distinguished from one another.

Each of the engagement devices C is a hydraulically-operated frictional engagement device in the form of a multiple-disc type or a single-disc type clutch or brake that is to be pressed by a hydraulic actuator, or a band brake that is to be tightened by a hydraulic actuator. The vehicle 10 is provided with a hydraulic control unit (hydraulic control circuit) 50 that includes solenoid valves SL1-SL6 (see FIG. 1) each of which is configured to regulate a hydraulic pressure. The hydraulic pressure regulated by each of the solenoid valves SL1-SL6 is supplied to a corresponding one of the engagement devices C, so as to serve as a clutch pressure Pc that is an engaging pressure of the corresponding one of the engagement devices C. An operation state of each of the engagement devices C is to be switched among engaged, slipped and released states, for example, with a torque capacity in the form of a clutch torque Tc (i.e., a corresponding one of clutch torques Tc1, Tc2, Tc3, Tc4, Tb1, Tb2) being changed by the clutch pressure Pc (i.e., a corresponding one of clutch pressures Pc1, Pc2, Pc3, Pc4, Pb1, Pb2). In the present embodiment, although not shown in the drawings, a mechanical oil pump is provided to be rotated or driven by the engine 12, and a working fluid pumped up by the oil pump is supplied as an original pressure to the hydraulic control unit 50.

In the automatic transmission 24, rotary elements of the plurality of planetary gear devices are selectively connected to each other directly or through the engagement devices C, or are selectively connected to the transmission input shaft 34, casing 18 or the transmission output gear 32 directly or through the engagement devices C. The rotary elements of the first planetary gear device 36 consist of a first sun gear S1, a first carrier CA1 and a first ring gear R1. The rotary elements of the second planetary gear device 38 consist of a second sun gear S2, a carrier RCA and a ring gear RR. The rotary elements of the third planetary gear device 40 consist of a third sun gear S3, the above-described carrier RCA and the above-described ring gear RR. That is, each of the second and third planetary gear devices 38, 40 is so-called Ravigneaux type in which the carrier RCA and the ring gear RR are common to the second and third planetary gear devices 38, 40.

The automatic transmission 24 is a step-variable transmission that is configured to establish a selected one of a plurality of gear positions that are different in gear ratio γ (=AT input rotational speed Ni/AT output rotational speed No), with selected ones of the engagement devices C being engaged. That is, the automatic transmission 24 is a step-variable automatic transmission in which a selected one of the plurality of gear positions is established. As shown in a table of FIG. 3, for example, the automatic transmission 24 is capable of establishing eight forward gear positions consisting of first-speed gear position "1st" through eighth-speed gear position "8th" and also one reverse gear position "Rev". Further, the automatic transmission 24 is capable of being placed in a neutral state with all of the engagement devices C being placed in released states, wherein the neutral state is a state in which none of the gear positions is established, namely, the transmission of the power is cut off. The gear ratio γ of the automatic transmission 24 is maximized when the first-speed gear position "1st" (i.e., lowest-speed gear position) is established in the automatic transmission 24, and is minimized when the eighth-speed gear position "8th" (i.e., highest-speed gear position) is established in the automatic transmission 24. The table of FIG. 3 indicates a relationship between each gear position established in the automatic transmission 24 and a combination of the engagement devices C that are to be placed in engaged states to establish the gear position in the automatic transmission 24, wherein "o" represents the engaged state of the corresponding engagement device C while bland represents the released state of the corresponding engagement device C. It is noted that the AT input rotational speed Ni is a rotational speed of the transmission input shaft 34, i.e., an input rotational speed of the automatic transmission 24, and that the AT output rotational speed No is a rotational speed of the transmission output gear 32, i.e., an output rotational speed of the automatic transmission 24. The gear ratio γ of each gear position is determined depending on gear ratios (=number of teeth of sun gear/number of teeth of ring gear) ρ1, ρ2, ρ3 of the respective first, second and third planetary gear devices 36, 38, 40. The gear ratio is synonymous with a speed ratio, and the gear position is synonymous with a shift position.

The automatic transmission 24 is to be controlled by an electronic control apparatus (control apparatus) 100 so as to establish a selected one of the plurality of gear positions, which is selected depending on, for example, an acceleration operation made by a driver of the vehicle 10 and a running speed V of the vehicle 10, with a releasing action of each of at least one releasing-side engagement device and an engaging action of each of at least one engaging-side engagement device being controlled by the electronic control apparatus 100, wherein the at least one releasing-side engagement device is at least one of the engagement devices C which is to be switched from its engaged state to its released state for establishing the selected one of the gear positions, and the at least one engaging-side engagement device is at least one of the engagement devices C which is to be switched from its released state to its engaged state for establishing the selected one of the gear positions. When a shifting action, i.e., a shift-down action or a shift-up action is to be executed in the automatic transmission 24, the electronic control apparatus 100 executes so-called "clutch-to-clutch" shifting operation made by the releasing action of each of the at least one releasing-side engagement device and the engaging action of each of the at least one engaging-side device, wherein the releasing action and the engaging action are executed concurrently with each other. For example, when the shift-down action is executed for switching from the second-speed gear position "2nd" to the first-speed gear position "1st", the first brake B1 as the releasing-side engagement device is released while the second brake B2 as the engaging-side engagement device is engaged, as shown in the table of FIG. 3. In this instance, the hydraulic pressure supplied to an hydraulic actuator of the first brake B1 and the hydraulic pressure supplied to an hydraulic actuator of the second brake B2 are appropriately regulated or controlled for enabling the releasing action of the first brake B1 and the engaging action of the second brake B2. In the following description, the shift-down action from the second-speed gear position "2nd" to the first-speed gear position "1st" will be referred to as "1←2 shift-down action", and the shift-up action from the first-speed gear position "1st" to the second-speed gear position "2nd" will be referred to as "1→2 shift-up action". The other shift-down and shift-up actions also will be referred in the same manner.

Figure 4:
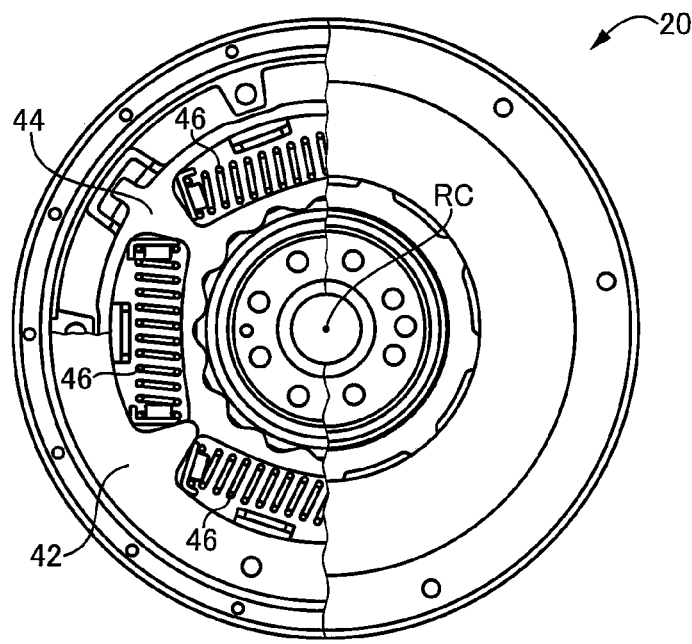
FIG. 4 is a view for explaining a construction of the damper.

As shown in FIGS. 2 and 4, the damper 20 includes a damper input member 42, a damper output member 44 and damper springs 46. The damper input member 42 and the damper output member 44 are provided to be rotatable relative to each other about the axis RC of the damper 20. The damper input member 42 is connected to a crank shaft 12a of the engine 12 in a power transmittable manner. The damper output member 44 is connected to the transmission input shaft 34 through the clutch 22 in a power transmittable manner. Each of the damper springs 46 is a coil spring disposed between the damper input member 42 and the damper output member 44, and is to be elastically deformed, more precisely, elastically compressed when the damper input member 42 is rotated relative to the damper output member 44 about the axis RC due to fluctuation of an output torque Te outputted from the engine 12. In the damper 20 constructed as described above, owing to the elastic deformation of each of the damper springs 46, namely, owing to the compression of each of the damper springs 46 in a circumferential direction of the damper 20, i.e., in a longitudinal direction of the damper spring 46, the fluctuation of the output torque Te outputted from the engine 12 is advantageously absorbed, until the elastic deformation reaches a certain maximum limit, namely, until the elastic deformation causes close contact so that the damper spring 46 is inhibited from being further deformed. When each of the damper springs 46 is inhibited from being further deformed, the absorption of the fluctuation of the output torque Te becomes insufficient.

Referring back to FIG. 1, the vehicle 10 is provided with the electronic control apparatus 100 as a controller including a control apparatus that is configured to perform various control operations of the vehicle 10 such as a shift control operation of the automatic transmission 24, for example. The electronic control apparatus 100 includes a so-called microcomputer incorporating a CPU, a ROM, a RAM and an input-output interface, for example. The CPU performs the various control operations of the vehicle 10, by processing various input signals, according to control programs stored in the ROM, while utilizing a temporary data storage function of the RAM.

The electronic control apparatus 100 receives various input signals from various sensors provided in the vehicle 10, such as: an output signal of an engine speed sensor 102 indicative of the engine rotational speed Ne [rpm]; an output signal of an input-shaft speed sensor 104 indicative of an AT input rotational speed Ni [rpm]; an output signal of an output-shaft speed sensor 106 indicative of an AT output rotational speed No [rpm] corresponding to a running speed V of the vehicle 10; an output signal of an accelerator-opening degree sensor 108 indicative of an accelerator opening degree θacc [%] corresponding to an operation amount of an accelerator pedal; and an output signal of a crank angle sensor 110 indicative of a crank angle θcr [rad] representing an angular position of the crank shaft 12a. Further, the electronic control apparatus 100 generates various output signals which are supplied to various devices (such as the hydraulic control unit 50 and the display device 112) provided in the vehicle 10, and which include a hydraulic-pressure-control command signal Sat and an information-display command signal Sinf for displaying various vehicle information. The hydraulic-pressure-control command signal Sat is a command signal by which each of the solenoid valves SL1-SL6 is to be operated for regulating a corresponding one of the clutch pressures Pc1, Pc2, Pc3, Pc4, Pb1, Pb2 supplied to hydraulic actuators of the respective engagement devices C, and is to be supplied to the hydraulic control unit 50. The display device 112 is a device that includes, for example, an alarm lamp or the like for displaying the vehicle information for the driver of the vehicle 10, wherein the vehicle information include, for example, information notifying failure of the engine 12 due to occurrence of a misfire in the engine 12.

As shown in FIG. 1, the electronic control apparatus 100 includes a shift control means in the form of a shift control portion 114, a misfire determination means in the form of a misfire determination portion 116 and a display control means in the form of a display control portion 118.

Figure 5:
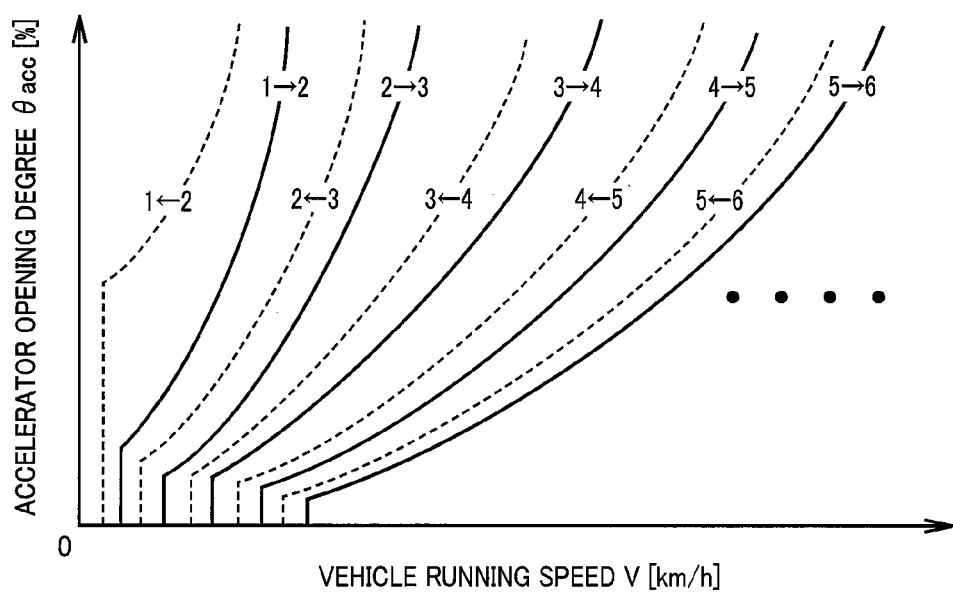
FIG. 5 is a view showing, by way of example, a gear-position shifting map used for a shift control operation executed in the automatic transmission.

The shift control portion 114 is configured to determine whether a shifting action is to be executed or not in the automatic transmission 24, by using a gear-position shifting map shown in FIG. 5 that represents a predetermined relationship, namely, a relationship which has been obtained by experimentation or determined by an appropriate design theory and which is stored, and is configured to execute a shift control operation for the automatic transmission 24, as needed. When executing the shift control operation for the automatic transmission 24, the shift control portion 114 supplies the hydraulic-pressure-control command signal Sat for switching an operation state (i.e., engaged/released state) of each of the engagement devices C by a corresponding one of the solenoid valves SL1-SL6, so as to automatically switch the gear position of the automatic transmission 24. As shown in FIG. 5, the gear-position shifting map is the predetermined relationship between two variables in the form of the vehicle running speed V and the accelerator opening degree θacc, wherein the relationship is to be used to determine whether the shifting action is to be executed or not in the automatic transmission 24, and is represented by shifting lines in two-dimensional coordinates in which the vehicle running speed V and the accelerator opening degree θacc are taken along respective two axes. It is noted that one of the two variables may be the AT output rotational speed No in place of the vehicle running speed V and that the other of the two variables may be a required drive torque Twdem or throttle-valve opening degree θth in place of the accelerator opening degree θacc. The shifting lines in the gear-position shifting map consist of shift-up lines (indicated by solid lines in FIG. 5) for determining whether a shift-up action is to be executed in the automatic transmission 24, and shift-down lines (indicated by broken lines in FIG. 5) for determining whether a shift-down action is to be executed in the automatic transmission 24. When a point representing a vehicle state defined by the vehicle running speed V and the accelerator opening degree θacc, is moved across one of the shifting lines, it is determined that the shifting action is to be executed to switch from a currently established one of the gear positions to another one of the gear positions in the automatic transmission 24. It is noted that the gear-position shifting map of FIG. 5 does not show the shift-up line for determining whether 6→7 shift-up action from the sixth-speed gear position to the seventh-speed gear position is to be executed, the shift-down line for determining whether 6←7 shift-down action from the seventh-speed gear position to the sixth-speed gear position is to be executed, the shift-up line for determining whether 7→8 shift-up action from the seventh-speed gear position to the eighth-speed gear position is to be executed, and the shift-down line for determining whether 7←8 shift-down action from the eighth-speed gear position to the seventh-speed gear position is to be executed.

Figure 6:
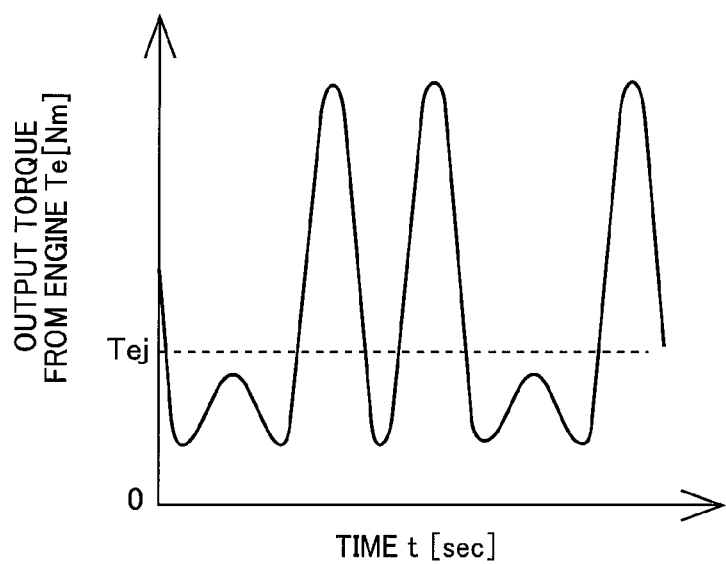
FIG. 6 a view showing fluctuation of an output torque outputted from an engine with three cylinders, when a misfire is caused in one of the three cylinders of the engine.

The misfire determination portion 116 is configured to determine whether the misfire such as unignitable state occurs or not in the engine 12, depending on whether periodical change in an angular acceleration (rotational acceleration) a [rad/sec$^2$] of the crank shaft 12a of the engine 12 is caused in synchronization with an ignition timing of the engine 12, namely, depending on whether periodical change in the output torque Te [Nm] of the engine 12 is caused in synchronization with the ignition timing of the engine 12, as shown in FIG. 6. The angular acceleration α of the crank shaft 12a is calculated based on the crank angle θcr detected by the crank angle sensor 110 in each sampling time, and the output torque Te is calculated from the angular acceleration α. The output torque Te pulsates in synchronization with the ignition timings of the cylinders of the engine 12. The misfire determination portion 116 determines that the misfire occurs in the engine 12, when the periodical change in the output torque Te is caused with a pulsation of the output torque Te corresponding to a certain one of the cylinders of the engine 12 being smaller than a predetermined determination torque value Tej, as shown in FIG. 6. Further, the misfire determination portion 116 determines that the misfire is not occurring when the pulsations synchronized with the ignition timing of all of the cylinders of the engine 12 are larger than the predetermined determination torque value Tej. FIG. 6 shows change of the output torque Te of the engine 12 in a case in which the misfire occurs in one of the three cylinders of the engine 12. In FIG. 6, the periodical change in the output torque Te is caused such that the output torque Te is made smaller than predetermined determination torque value Tej, in synchronization with the ignition timing of the one of the three cylinders of the engine 12, within a predetermined length of time.

When it is determined by the misfire determination portion 116 that the misfire occurs in the engine 12, the display control portion 118 causes the display device 112 to display the occurrence of the misfire, for example, by lighting the alarm lamp ON. It is noted that, even when it has been once determined by the misfire determination portion 116 that the misfire has occurred in the engine 12, if it is then determined by the misfire determination portion 116 that the misfire is not occurring in the engine 12, the display control portion 118 switches the alarm lamp from ON to OFF.

As shown in FIG. 1, the shift control portion 114 includes a misfire-case shift control means in the form of a misfire-case shift control portion 114a, and the misfire-case shift control portion 114a includes a gear-position determination means in the form of a gear-position determination portion 114b. When a predetermined first condition CD1 and a predetermined second condition CD2 are both satisfied, the misfire-case shift control portion 114a executes the shift-down action in the automatic transmission 24 such that the automatic transmission 24 is caused to establish a lower-speed gear position such as the fifth-speed gear position "5th", which provides the gear ratio γ higher the gear ratio γ provided by the sixth-speed gear position "6th". When it is determined by the misfire determination portion 116 that the misfire occurs in the engine 12, the gear-position determination portion 114b determines whether the gear position established in the automatic transmission 24 upon the determination of the occurrence of the misfire in the engine 12 is a gear position X that provides the gear ratio γ within a torque-fluctuation insufficient absorption region, wherein the gear position X corresponds to any one of the sixth-speed gear position "6th", seventh-speed gear position "7th" and eighth-speed gear position "8th" in the present embodiment. The above-described first condition CD1 is satisfied when it is determined by the misfire determination portion 116 that the misfire occurs in the engine 12. The above-described second condition CD2 is satisfied when it is determined by the gear-position determination portion 114b that the gear position established in the automatic transmission 24 is one of the sixth-speed gear position "6th", seventh-speed gear position "7th" and eighth-speed gear position "8th" that correspond to the gear position X. It is noted that a range in which the gear ratio γ of the automatic transmission 24 is variable includes the torque-fluctuation insufficient absorption region that has been obtained by experimentation or determined by an appropriate design theory. When the gear ratio γ of the automatic transmission 24 is within the torque-fluctuation insufficient absorption region, if the misfire occurs in the engine 12, each of the damper springs 46 of the damper 20 is elastically deformed to the above-described certain maximum limit, whereby the damper springs 46 are inhibited from further deformed, so that it is difficult to enable the damper 20 to suppress the relatively large fluctuation of the load applied to the automatic transmission 24 owing to the occurrence of the misfire. The gear ratio γ provided by any one of the sixth-speed gear position, seventh-speed gear position and eighth-speed gear position is within the torque-fluctuation insufficient absorption region. The gear ratio γ provided by the sixth-speed gear position corresponds to a higher threshold value of the torque-fluctuation insufficient absorption region. The gear ratio γ provided by the eighth-speed gear position corresponds to a lower threshold value of the torque-fluctuation insufficient absorption region. That is, in the event of occurrence of the misfire in the engine 12 when the gear ratio γ of the gear position established in the automatic transmission 24 is within the torque-fluctuation insufficient absorption region, the misfire-case shift control portion 114a executes the shift-down action in the automatic transmission 24 to establish the fifth-speed gear position that provides the gear ratio γ higher than the gear ratio γ which is provided by the sixth-speed gear position and which corresponds to the above-described higher threshold value of the torque-fluctuation insufficient absorption region. It is noted that the above-described range (in which the gear ratio γ of the automatic transmission 24 is variable) corresponds to a range defined between the maximum gear ratio γ and the minimum gear ratio γ that can be provided in the automatic transmission 24, and corresponds to a range defined between the gear ratio γ provided in the first-speed gear position and the gear ratio γ provided in the eighth-speed gear position in the present embodiment. Further, in the present embodiment, the above-described torque-fluctuation insufficient absorption region corresponds to a region defined between the gear ratio γ of the sixth-speed gear position and the gear ratio γ of the eighth-speed gear position. Moreover, the above-described lower-speed gear position is a gear position providing the gear ratio γ that makes the vehicle running speed V lower, namely, the gear ratio γ that is relatively high.

Figure 7:
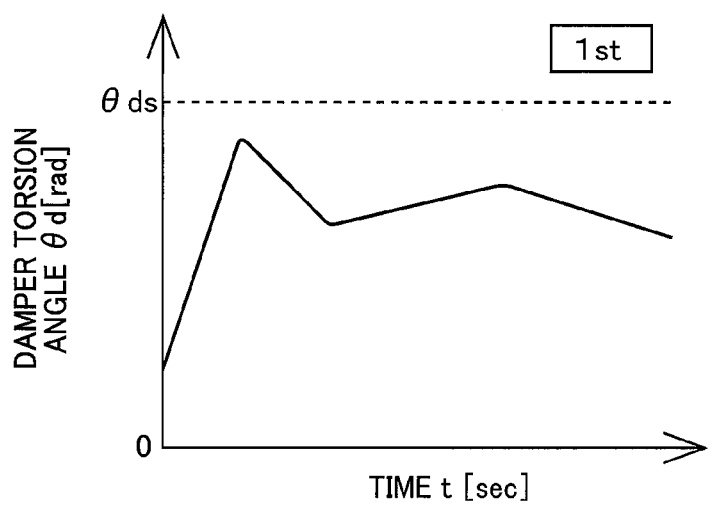
FIG. 7 is a view showing change of a torsion angle of the damper upon occurrence of the misfire in the engine as shown in FIG. 6, in a case in which a first-speed gear position is established in the automatic transmission.
Figure 8:
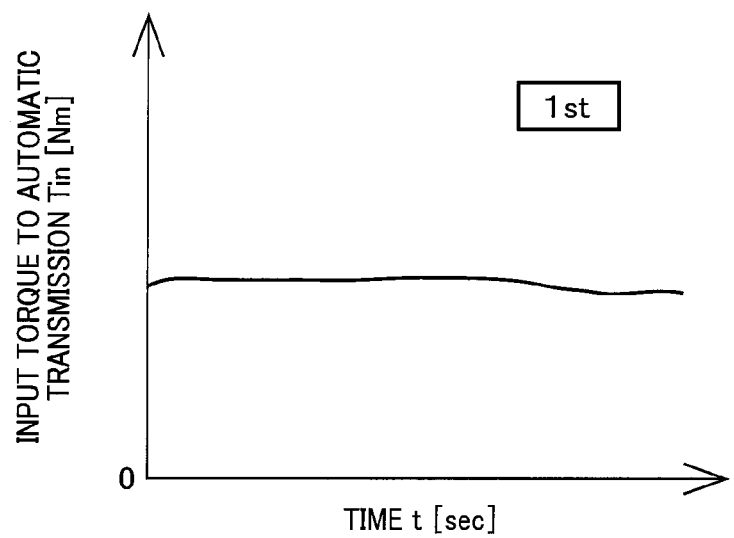
FIG. 8 is a view showing change of an input torque inputted to the automatic transmission upon the occurrence of the misfire in the engine as shown in FIG. 6, in the case in which the first-speed gear position is established in the automatic transmission.
Figure 9:
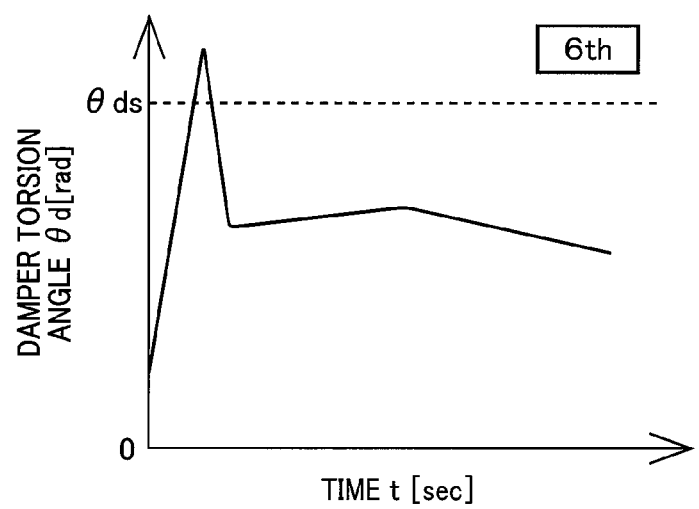
FIG. 9 is a view showing change of the torsion angle of the damper upon occurrence of the misfire in the engine as shown in FIG. 6, in a case in which a sixth-speed gear position is established in the automatic transmission.
Figure 10:
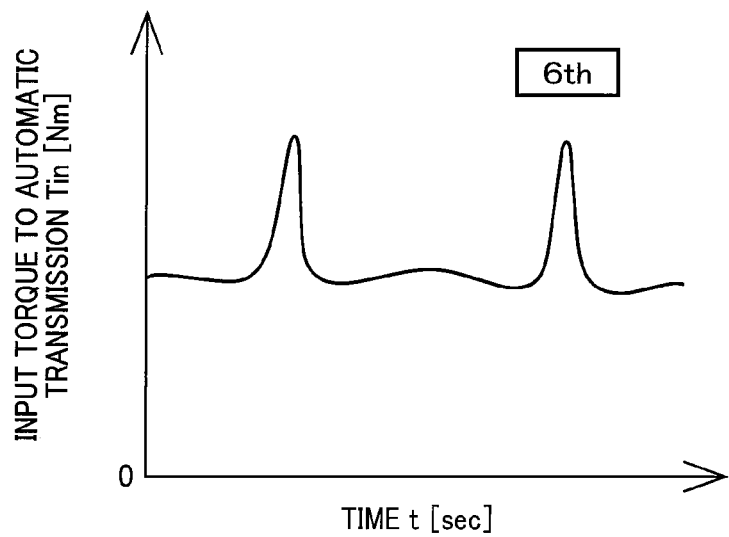
FIG. 10 is a view showing change of the input torque inputted to the automatic transmission upon the occurrence of the misfire in the engine as shown in FIG. 6, in the case in which the sixth-speed gear position is established in the automatic transmission.

FIG. 7 is a view showing change of a torsion angle θd [rad] of the damper 20 upon occurrence of the misfire in the engine 12, for example, as shown in FIG. 6, in a case in which the first-speed gear position "1st" is established in the automatic transmission 24. FIG. 8 is a view showing change of an input torque Tin [Nm] inputted to the transmission input shaft 34 of the automatic transmission 24 upon the occurrence of the misfire in the engine 12, for example, as shown in FIG. 6, in the case in which the first-speed gear position "1st" is established in the automatic transmission 24. FIG. 9 is a view showing change of the torsion angle θd [rad] of the damper 20 upon occurrence of the misfire in the engine 12, for example, as shown in FIG. 6, in a case in which the sixth-speed gear position "6th" is established in the automatic transmission 24. FIG. 10 is a view showing change of the input torque Tin [Nm] inputted to the transmission input shaft 34 of the automatic transmission 24 upon the occurrence of the misfire in the engine 12, for example, as shown in FIG. 6, in the case in which the sixth-speed gear position "6th" is established in the automatic transmission 24. The torsion angle θd of the damper 20 (hereinafter simply referred to as "damper torsion angle") shown in FIGS. 7 and 9 is an angle by which the damper input member 42 is rotated relative to the damper output member 44 about the axis RC in a direction that causes the damper springs 46 to be compressed in the damper 20. In FIGS. 7 and 9, "θds" represents a mechanical end angle that is the damper torsion angle θd when each of the damper springs 46 is compressed to the above-described certain maximum limit by the relative rotation of the damper input member 42 and the damper output member 44 so as to be inhibited from being further elastically deformed. That is, the mechanical end angle θds is the damper torsion angle θd when the damper springs 46 are compressed to the certain maximum limit at which axially adjacent portions of a helically-extending wire of each of the damper springs 46 are in close contact with each other so that the damper input member 42 and the damper output member 44 are practically in contact with each other through the damper springs 46. It is noted that a resonance frequency of the automatic transmission 24 varies depending on the gear position established in the automatic transmission 24, so that a maximum value of the damper torsion angle θd varies between the case of FIG. 7 and the case of FIG. 9. Further, each of the damper springs 46 is a spring that is inhibited from being elastically deformed further from the above-described certain maximum limit, namely, inhibited from being elastically deformed by an amount that would allow the torsion angle θd of the damper 20 to be larger than the mechanical end angle θds.

Figure 11:
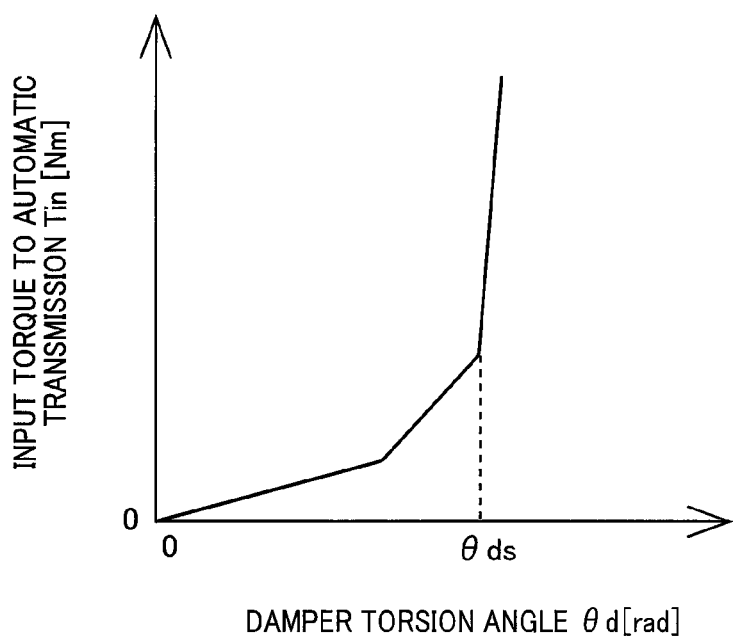
FIG. 11 is a view showing a relationship between the input torque inputted to the automatic transmission and the torsion angle of the damper.

When the first-speed gear position is established in the automatic transmission 24, namely, when the gear ratio γ of the automatic transmission 24 is higher than the higher threshold value of the torque-fluctuation insufficient absorption region, the damper springs 46 are not elastically deformed to the above-described certain maximum limit even if the misfire is occurring in the engine 12, as shown in FIG. 7. Therefore, as shown in FIG. 8, the large fluctuation of the load applied to the automatic transmission 24 is satisfactorily suppressed by the damper 20, even in the event of occurrence of the misfire in the engine 12 (cf. FIG. 10). On the other hand, when the sixth-speed gear position is established in the automatic transmission 24, namely, when the gear ratio γ of the automatic transmission 24 is within the torque-fluctuation insufficient absorption region, the damper springs 46 are elastically deformed to the certain maximum limit if the misfire is occurring in the engine 12, as shown in FIG. 9. Therefore, as shown in FIG. 10, the load applied to the automatic transmission 24 is largely fluctuated due to the misfire in the engine 12. That is, as shown in FIGS. 7-10, even in the event of occurrence of the misfire in the engine 12, it is possible to enable the damper 20 to suppress the large fluctuation of the load applied to the automatic transmission 24, with the gear ratio γ of the automatic transmission 24 being made higher than the higher threshold value of the torque-fluctuation insufficient absorption region. It is noted that FIG. 11 is a view showing a relationship between the input torque Tin inputted to the automatic transmission 24 and the damper torsion angle θd. As shown in FIG. 11, when the damper torsion angle θd reaches the mechanical end angle θds or more, the input torque Tin is abruptly increased.

Further, when the first and second conditions CD1, CD2 are both satisfied, the misfire-case shift control portion 114a switches from the gear-position shifting map of FIG. 5 to a predefined misfire-case gear-position shifting map, so as to inhibit execution of the shift-up action of the automatic transmission 24 for establishing a higher-speed gear position whose gear ratio γ is not higher than the gear ratio γ of the sixth-speed gear position which corresponds to the higher threshold value of the torque-fluctuation insufficient absorption region, namely, so as to inhibit execution of the shift-up action of the automatic transmission 24 for establishing any one of the sixth-speed gear position, seventh-speed gear position and eighth-speed gear position. The above-described misfire-case gear-position shifting map is different from the gear-position shifting map of FIG. 5, for example, in that the shift-up line for determining whether 5→6 shift-up action is to be executed, the shift-down line for determining whether 5←6 shift-down action is to be executed, the shift-up line for determining whether 6→7 shift-up action is to be executed, the shift-down line for determining whether 6←7 shift-down action is to be executed, the shift-up line for determining whether 7→8 shift-up action is to be executed, and the shift-down line for determining whether 7←8 shift-down action is to be executed, are absent. The above-described higher-speed gear position is a gear position providing the gear ratio γ that makes the vehicle running speed V higher, namely, the gear ratio γ that is relatively low. After having inhibited the shift-up action to establish any one of the sixth-speed gear position, seventh-speed gear position and eighth-speed gear position, when it is determined by the misfire determination portion 116 that the misfire is not occurring in the engine 12 and the determination of the occurrence of the misfire in the engine 12 by the misfire determination portion 116 is cancelled, the misfire-case shift control portion 114a switches back to the gear-position shifting map of FIG. 5 from the above-described misfire-case gear-position shifting map, so as to allow the automatic transmission 24 to execute the shift-up action for establishing the sixth-speed gear position, seventh-speed gear position or eighth-speed gear position in the automatic transmission 24.

Figure 12:
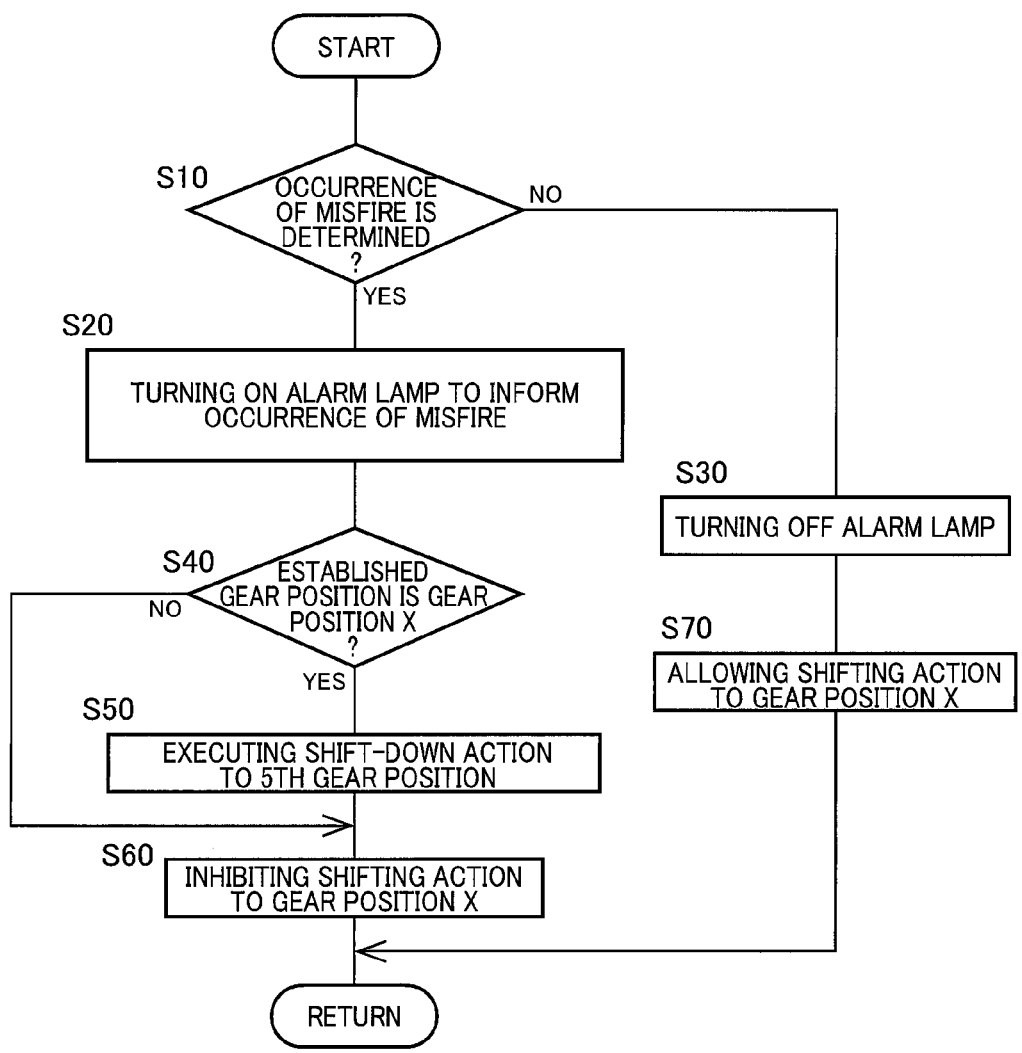
FIG. 12 is a flow chart showing a main part of a control routine executed by an electronic control apparatus, namely, a control routine that is executed for suppressing the large fluctuation of the torque applied to the automatic transmission of the vehicle upon the occurrence of the misfire in the engine.

FIG. 12 is a flow chart showing a main part of a control routine executed by the electronic control apparatus 100, namely, a control routine that is to be executed for suppressing the large fluctuation of the torque applied to the automatic transmission 24 upon the occurrence of the misfire in the engine 12.

This control routine shown in the flow chart of FIG. 12 is initiated with step S10 corresponding to function of the misfire determination portion 116, which is implemented to determine whether it is determined that the misfire is occurring in the engine 12, namely, determine whether the misfire is occurring in the engine 12. When an affirmative determination is made at step S10, namely, when the misfire is occurring in the engine 12, step S20 corresponding to function of the display control portion 118 is implemented. When a negative determination is made at step S10, namely, when the misfire is not occurring in the engine 12, step S30 corresponding to function of the display control portion 118 is implemented. At step S20, the alarm lamp is turned ON so as to inform the driver of the vehicle 10 of the occurrence of the misfire. At step S30, the alarm lamp is turned OFF if the alarm lamp is ON.

Step S20 is followed by step S40 corresponding to the gear-position determination portion 114b, which is implemented to determine whether the gear position established in the automatic transmission 24 is the gear position X, namely, determine whether one of the sixth-speed gear position, seventh-speed gear position and eighth-speed gear position is established in the automatic transmission 24. When an affirmative determination is made at step S40, namely, when the gear position established in the automatic transmission 24 is the gear position X, step S50 corresponding to function of the misfire-case shift control portion 114a is implemented. When a negative determination is made at step S40, namely, when the gear position established in the automatic transmission 24 is one of the first-speed gear position, second-speed gear position, third-speed gear position, forth-speed gear position and fifth-speed gear position that are other than the gear position X, step S60 corresponding to function of the misfire-case shift control portion 114a is implemented.

At step S50, the shift-down action is executed to establish the fifth-speed gear position "5th" as the lower-speed gear position that provides the gear ratio γ higher the gear ratio γ provided by the sixth-speed gear position "6th". At step S60, the shift-up action for establishing any one of the sixth-speed gear position, seventh-speed gear position and eighth-speed gear position that correspond to the gear position X, is inhibited. Step S30 is followed by step S70 corresponding to function of the misfire-case shift control portion 114a, which is implemented to allow the shift-up action for establishing one of the sixth-speed gear position, seventh-speed gear position and eighth-speed gear position, if the shift-up action for establishing any one of the sixth-speed gear position, seventh-speed gear position and eighth-speed gear position has been inhibited.

As described above, according to the electronic control apparatus 100 for the vehicle 10 of the present embodiment, the range in which the gear ratio γ of the automatic transmission 24 is variable includes the torque-fluctuation insufficient absorption region in which each of the damper springs 46 of the damper 20 is elastically deformed to the certain maximum limit when the misfire occurs in the engine 12, wherein the electronic control apparatus 100 includes:

the misfire determination portion 116 configured to determine occurrence of the misfire in the engine 12; and the misfire-case shift control portion 114a configured, upon determination of the occurrence of the misfire in the engine 12 by the misfire determination portion 116 when the gear ratio γ of the automatic transmission 24 is in the torque-fluctuation insufficient absorption region, to cause the automatic transmission 24 to execute the shift-down action such that the gear ratio γ becomes higher than the higher threshold value of the torque-fluctuation insufficient absorption region. Thus, when the occurrence of the misfire of the engine 12 is determined by the misfire determination portion 116, the misfire-case shift control portion 114a causes the automatic transmission 24 to execute the shift-down action by which the gear ratio γ becomes higher than the higher threshold value of the torque-fluctuation insufficient absorption region, so that each of the damper springs 46 becomes not deformed to the certain maximum limit even in the event of occurrence of the misfire in the engine 12, namely, so that each of the damper springs 46 becomes not deformed to a certain extent at which further deformation of the damper spring 46 is inhibited. It is therefore possible to enable the damper 20 to advantageously suppress large fluctuation of the load applied to the automatic transmission 24 in the event of the occurrence of the misfire in the engine 12. Further, since the large fluctuation of the load applied to the automatic transmission 24 is suppressed by the misfire-case shift control portion 114a in the event of the occurrence of the misfire, it is possible to eliminate a need to release the clutch 22 for suppressing the large fluctuation of the load applied to the automatic transmission 24 in the event of the occurrence of the misfire, and to advantageously suppress change of behavior of the vehicle 10 upon the occurrence of the misfire in the engine 12.

Further, according to the electronic control apparatus 100 for the vehicle 10 of the present embodiment, the misfire-case shift control portion 114a is configured, when the determination of the occurrence of the misfire in the engine 12 by the misfire determination portion 116 is cancelled, to allow the automatic transmission 24 to execute the shift-up action such that the gear ratio γ becomes not higher than the higher threshold value of the torque-fluctuation insufficient absorption region. Thus, even if the occurrence of the misfire of the engine 12 has been once determined by the misfire determination portion 116, when the determination of the occurrence of the misfire of the engine 12 is cancelled, the misfire-case shift control portion 114a allows execution of the shift-up action by which the gear ratio γ of the automatic transmission 24 becomes not higher than the higher threshold value of the torque-fluctuation insufficient absorption region.

Further, according to the electronic control apparatus 100 for the vehicle 10 of the present embodiment, the misfire determination portion 116 determines the occurrence of the misfire in the engine 12, depending on whether the periodical change in the angular acceleration α of the crank shaft 12a of the engine 12 is caused in synchronization with the ignition timing of the engine 12. Therefore, the determination of the occurrence of the misfire in the engine 12 can be made more reliably by the misfire determination portion 116.

Further, according to the electronic control apparatus 100 for the vehicle 10 of the present embodiment, the vehicle 10 includes the display device 112 configured to display the vehicle information for the vehicle driver, wherein the electronic control apparatus 100 is configured, when the occurrence of the misfire in the engine 12 is determined by the misfire determination portion 116, to cause the display device 112 to display the occurrence of the misfire. Thus, since the occurrence of the misfire of the engine 12 is displayed upon determination of the occurrence of the misfire by the misfire determination portion 116, it is possible to guide the vehicle driver to promptly take the vehicle 10 to a service maintenance workshop or the like.

Further, according to the electronic control apparatus 100 for the vehicle 10 of the present embodiment, the automatic transmission 24 is the step-variable automatic transmission configured to establish a selected one of the plurality of gear positions. That is, the present invention is advantageously applicable to the vehicle 10 including the automatic transmission 24 that is the step-variable automatic transmission.

There will be described another embodiment of the present invention. The same reference signs as used in the above-described first embodiment will be used in the following second embodiment, to identify the functionally corresponding elements, and descriptions thereof are not provided.

Second Embodiment

Figure 13:
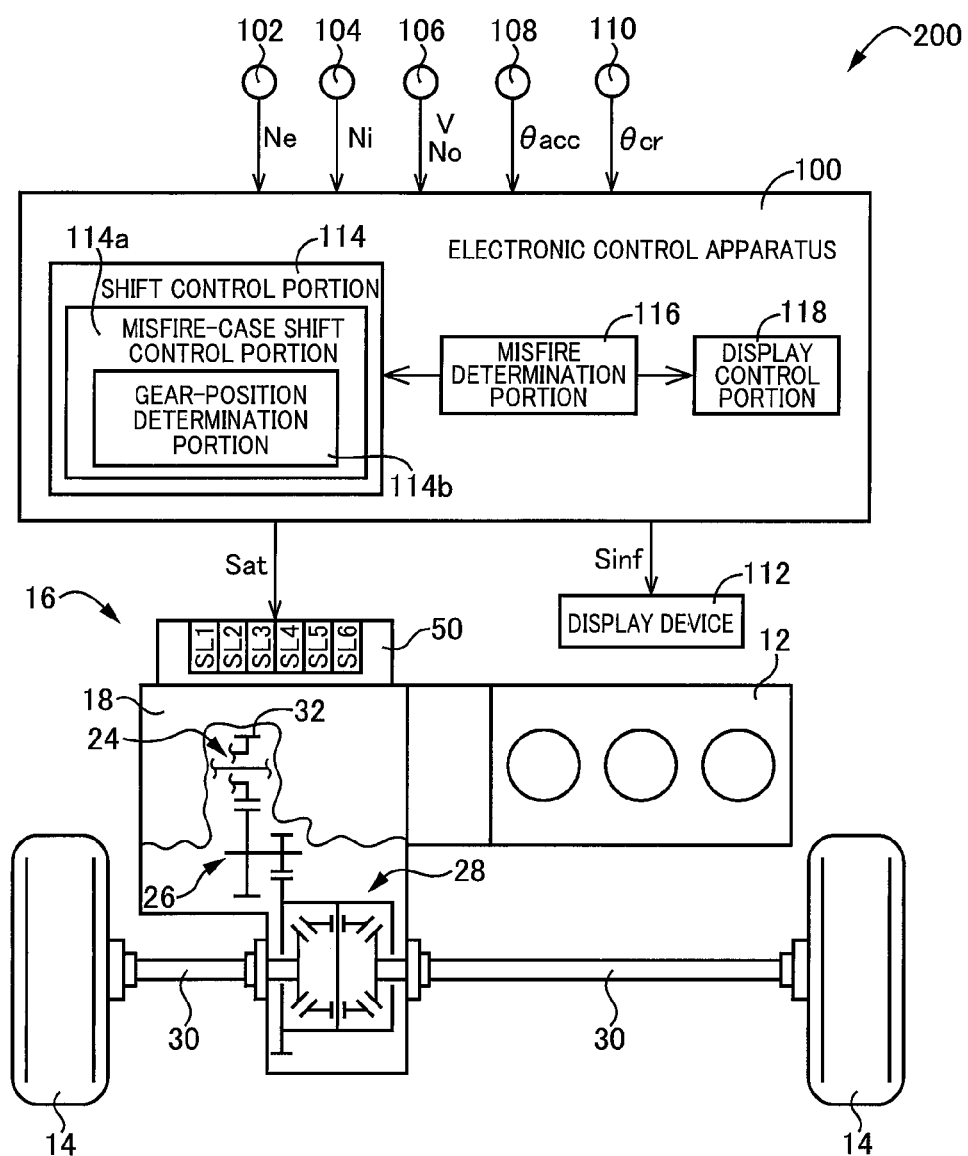
FIG. 13 is a view for explaining a vehicle according to another embodiment (second embodiment) of the present invention.
Figure 14:
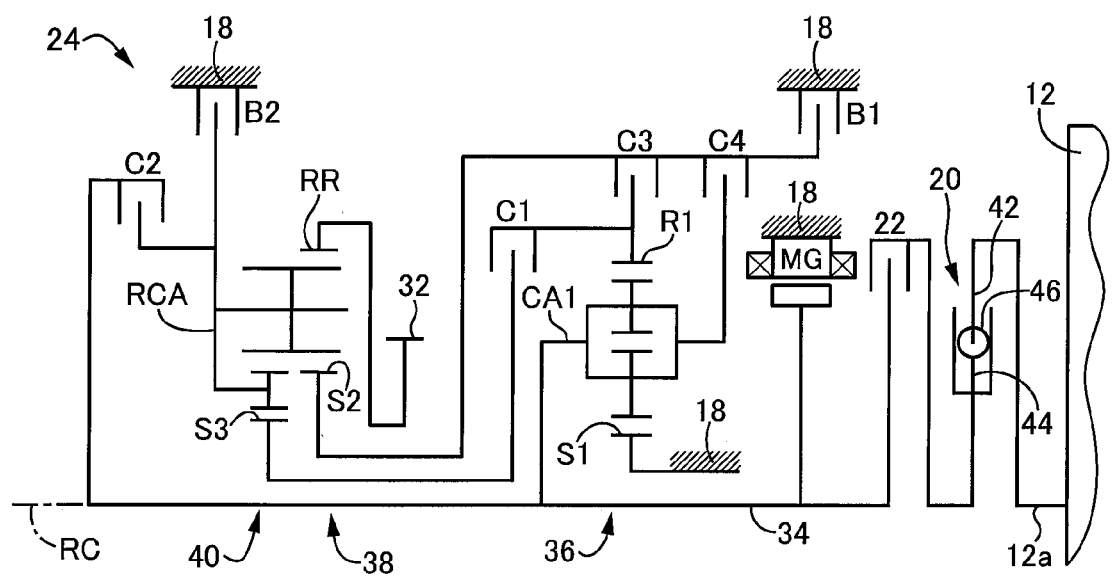
FIG. 14 is a schematic view for explaining a construction of the vehicle shown in FIG. 13.

FIGS. 13 and 14 are views for explaining a vehicle 200 according to another embodiment (second embodiment) of the present invention. The vehicle 200 according to this second embodiment is substantially identical with the above-described vehicle 100 according to the first embodiment, except for presence of an electric motor MG. As shown in FIG. 14, the electric motor MG serving as a drive power source is disposed in a power transmission path between the clutch 22 and the automatic transmission 24.

In the vehicle 200 according to this second embodiment, the electric motor MG serving as the drive power source is disposed in the power transmission path between the clutch 22 and the automatic transmission 24, as described above. Thus, the present invention can be applied also to a one-motor hybrid vehicle having the drive power sources in the form of the engine 12 and the one electric motor MG.

While the preferred embodiments of this invention have been described in detail by reference to the drawings, it is to be understood that the invention may be otherwise embodied.

For example, in the above-described embodiments, the automatic transmission 24 is constituted by the step-variable automatic transmission configured to establish a selected one of the plurality of gear positions. However, the automatic transmission 24 may be constituted by a continuously-variable transmission. That is, the present invention is applicable not only to the vehicle 10 including the step-variable automatic transmission, but also to a vehicle including the continuously-variable transmission.

In the above-described embodiments, the power transmitting apparatus 16 is not provided with a fluid transmission device such as a torque converter that is provided with a lockup clutch. However, the present invention is applicable also to a vehicle in which the power transmitting apparatus 16 includes a fluid transmission device such as a torque converter that is provided with a lockup clutch, because the same issue could be caused also in such a vehicle, for example, when the lockup clutch is engaged upon occurrence of the misfire in the engine 12.

In the above-described embodiments, the misfire determination portion 116 determines the occurrence of the misfire, for example, when the unignitable state occurs in the engine 12. However, the misfire determination portion 116 may determine the occurrence of the misfire, for example, when a slow combustion such as combustion failure occurs in the engine 12.

In the above-described embodiments, each of the damper springs 46 is constituted by the coil spring. However, each damper spring 46 may be constituted by a spring having a shape other than a coil shape. That is, each damper spring 46 may have any shape as long as the elastic deformation (that is caused by relative rotation of the damper input member 42 and the damper output member 44 in the damper 20) is limited to a certain maximum limit, and each damper spring 46 is inhibited from being further deformed when having been deformed to the certain maximum limit. Further, the damper 20 may be provided with a stopper configured to limit the elastic deformation of each damper spring 46.

In the above-described embodiment, when it is determined by the misfire determination portion 116 that the misfire in the engine 12 is detected, the misfire-case shift control portion 114a executes the shift-down action by which the fifth-speed gear position is established in the automatic transmission 24. However, in this case, the shift-down action may be executed to establish the fourth-speed gear position, third-speed gear position, second-speed gear position or first-speed gear position, each of which as well as the fifth-speed gear position provides the gear ratio γ higher than the higher threshold value of the torque-fluctuation insufficient absorption region.

It is to be understood that the embodiments described above are given for illustrative purpose only, and that the present invention may be embodied with various modifications and improvements which may occur to those skilled in the art.

NOMENCLATURE OF ELEMENTS

10; 200: vehicle
12: engine (internal combustion engine)
20: damper
22: clutch
24: automatic transmission
46: damper spring
100: electronic control apparatus (control apparatus)
112: display device
114a: misfire-case shift control portion
114b: gear-position determination portion
116: misfire determination portion
118: display control portion
MG: electric motor
Te: output torque (torque)
α: angular acceleration (rotational acceleration)
γ: gear ratio

What is claimed is:

1. A control apparatus for a vehicle that includes: an internal combustion engine; an automatic transmission; a damper and a clutch, such that the damper and the clutch are disposed between the internal combustion engine and the automatic transmission,
wherein the damper includes a damper spring that is elastically deformable to a certain maximum limit, and is configured to absorb fluctuation of torque outputted from the internal combustion engine owing to elastic deformation of the damper spring,
wherein the clutch is configured to establish and interrupt transmission of a power between the internal combustion engine and the automatic transmission,
wherein the automatic transmission has a gear ratio that is variable in a range including a torque-fluctuation insufficient absorption region in which the damper spring of the damper is elastically deformed to the certain maximum limit when a misfire occurs in the internal combustion engine,
wherein the control apparatus comprises:
a misfire determination portion configured to determine occurrence of the misfire in the internal combustion engine; and
a misfire-case shift control portion configured, upon determination of the occurrence of the misfire in the internal combustion engine by the misfire determination portion when the gear ratio of the automatic transmission is in the torque-fluctuation insufficient absorption region, to cause the automatic transmission to execute a shift-down action such that the gear ratio becomes higher than a higher threshold value of the torque-fluctuation insufficient absorption region.

2. The control apparatus according to claim 1,
wherein the misfire-case shift control portion is configured, when the determination of the occurrence of the misfire in the internal combustion engine by the misfire determination portion is cancelled, to allow the automatic transmission to execute a shift-up action such that the gear ratio becomes not higher than the higher threshold value of the torque-fluctuation insufficient absorption region.

3. The control apparatus according to claim 1,
wherein the vehicle further includes an electric motor which serves as a drive power source and which is provided in a power transmission path between the clutch and the automatic transmission.

4. The control apparatus according to claim 1,
wherein the misfire determination portion is configured to determine the occurrence of the misfire in the internal combustion engine, depending on whether periodical change in a rotational acceleration of the internal combustion engine is caused in synchronization with an ignition timing of the internal combustion engine.

5. The control apparatus according to claim 1,
wherein the vehicle includes a display device configured to display vehicle information for a driver of the vehicle, and
wherein the control apparatus is configured, when the occurrence of the misfire in the internal combustion engine is determined by the misfire determination portion, to cause the display device to display the occurrence of the misfire.

6. The control apparatus according to claim 1,
wherein the automatic transmission is a step-variable automatic transmission configured to establish a selected one of a plurality of gear positions.

* * * * *